(12) United States Patent
Peng

(10) Patent No.: US 12,474,601 B2
(45) Date of Patent: Nov. 18, 2025

(54) SMART HEAD-MOUNTED DEVICE, ACCOMMODATING BOX, AND SMART HEAD-MOUNTED DEVICE ASSEMBLY

(71) Applicant: VIVO MOBILE COMMUNICATION CO., LTD., Guangdong (CN)

(72) Inventor: Zhuyang Peng, Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 371 days.

(21) Appl. No.: 18/073,163

(22) Filed: Dec. 1, 2022

(65) Prior Publication Data

US 2023/0094296 A1    Mar. 30, 2023

Related U.S. Application Data

(63) Continuation of application No. PCT/CN2021/095941, filed on May 26, 2021.

(30) Foreign Application Priority Data

Jun. 2, 2020   (CN) .......................... 202010490086.6

(51) Int. Cl.
*G02C 11/00* (2006.01)
*A45C 11/04* (2006.01)
(Continued)

(52) U.S. Cl.
CPC .............. *G02C 11/10* (2013.01); *A45C 11/04* (2013.01); *G02C 5/122* (2013.01); *G02C 9/00* (2013.01); *G06F 1/163* (2013.01)

(58) Field of Classification Search
CPC . G02C 11/10; G02C 5/08; G02C 5/20; G02C 5/006; G02C 5/122; G02C 9/00;
(Continued)

(56) References Cited

U.S. PATENT DOCUMENTS 2,446,966 A * 8/1948 Swikart .................. A45C 11/04
206/6
6,164,442 A * 12/2000 Stravitz .................... A45C 3/02
221/45
(Continued)

FOREIGN PATENT DOCUMENTS

CN     202522773 U    11/2012
CN     105572909 A     5/2016
(Continued)

OTHER PUBLICATIONS

Oliver Amft et al., Making Regular Eyeglasses Smart, Pervasive Computing 32-43 (2015). (Year: 2015).*
(Continued)

*Primary Examiner* — James R Greece
(74) *Attorney, Agent, or Firm* — The Webb Law Firm

(57) ABSTRACT

A smart head-mounted device includes a first sub-eyepiece, a second sub-eyepiece, and a nose bridge. The first sub-eyepiece includes a first eyepiece frame and a first temple, and the first eyepiece frame has a first connecting portion; the second sub-eyepiece includes a second eyepiece frame and a second temple, and the second eyepiece frame has a second connecting portion; the nose bridge has a third connecting portion and a fourth connecting portion; and the first eyepiece frame is detachably connected to the nose bridge via the first connecting portion and the third connecting portion, and the second eyepiece frame is detachably connected to the nose bridge via the second connecting portion and the fourth connecting portion.

13 Claims, 6 Drawing Sheets

(51) Int. Cl.
  *G02C 5/12* (2006.01)
  *G02C 9/00* (2006.01)
  *G06F 1/16* (2006.01)

(58) Field of Classification Search
  CPC . G02C 2200/02; G02C 2200/08; G06F 1/163; G02B 27/0172; G02B 27/0176; G02B 2027/0178; H02J 7/00; H02J 7/0044; H02J 50/10; H02J 2310/22; A45C 11/04
  See application file for complete search history.

(56) References Cited

U.S. PATENT DOCUMENTS

| | | | | |
|---|---|---|---|---|
| 6,164,452 | A * | 12/2000 | Ellis | A45F 5/00 206/5 |
| 9,625,741 | B1 * | 4/2017 | Tammaro | G02C 9/04 |
| 10,816,825 | B2 | 10/2020 | Yoshida | |
| 11,644,693 | B2 * | 5/2023 | Howell | G02C 11/06 351/158 |
| 2005/0016882 | A1 * | 1/2005 | Kankaria | A45C 3/02 206/316.1 |
| 2018/0136491 | A1 | 5/2018 | Ashwood et al. | |
| 2021/0157167 | A1 | 5/2021 | Lim et al. | |
| 2021/0223577 | A1 * | 7/2021 | Zhang | H04R 1/24 |
| 2021/0376661 | A1 * | 12/2021 | Bohn | G02C 11/10 |
| 2022/0179213 | A1 | 6/2022 | Zhou et al. | |

FOREIGN PATENT DOCUMENTS

| | | | | |
|---|---|---|---|---|
| CN | 105938248 | A | | 9/2016 |
| CN | 108065548 | A * | | 5/2018 |
| CN | 208046851 | U | | 11/2018 |
| CN | 110007487 | A | | 7/2019 |
| CN | 209821503 | U | | 12/2019 |
| CN | 209879169 | U | | 12/2019 |
| CN | 110927988 | A | | 3/2020 |
| CN | 110989197 | A * | | 4/2020 |
| CN | 111568013 | A * | 8/2020 | A45C 11/04 |
| CN | 111708164 | A | | 9/2020 |
| DE | 202016103431 | U1 * | | 9/2016 |
| JP | WO2015079610 | A1 | | 3/2017 |
| TW | M296990 | U | | 9/2006 |
| TW | M506974 | U | | 8/2015 |
| WO | 2019198875 | A1 | | 10/2019 |

OTHER PUBLICATIONS

Denise M. Wilson et al., Safety Goggle Compliance Monitoring Using Hall Effect Sensors, 2 Sensor Systems 5500504-1 to 5500504-4 (2018). (Year: 2018).*
Machine English Translation of CN 202522773 U obtained from Patent Translate, and filed with CN 202522773 U. (Year: 2025).*
Machine English Translation of TW M296990 U obtained from Clarivate Analytics, and filed with TW M296990 U. (Year: 2025).*

* cited by examiner

SMART HEAD-MOUNTED DEVICE, ACCOMMODATING BOX, AND SMART HEAD-MOUNTED DEVICE ASSEMBLY

CROSS-REFERENCE TO RELATED APPLICATIONS

This application is a Bypass Continuation Application of International Application No. PCT/CN2021/095941 filed May 26, 2021, and claims priority to Chinese Patent Application No. 202010490086.6 filed Jun. 2, 2020, the disclosures of which are hereby incorporated by reference in their entireties.

BACKGROUND OF THE INVENTION

Field of the Invention

The present application relates to the technical field of electronic devices, and in particular, to a smart head-mounted device, an accommodating box, and a smart head-mounted device assembly.

Description of Related Art

In recent years, with the progress of science and technology, smart wearable devices are constantly developing, and smart head-mounted devices as smart wearable devices are becoming increasingly popular, especially smart glasses products are increasingly favored by consumers. Nowadays, smart glasses have increasingly abundant functions, and their designs show a diversified trend. Functions such as Bluetooth calling, music playing, sports recording, and photographing can be realized. Shapes of existing smart glasses are similar to that of common glasses, having two fixed eyepiece frames and two temples. A size of entire smart glasses is relatively large, thereby being inconvenient to store and carry. In addition, smart glasses in the prior art cannot be worn and used in a charging state, and cannot be charged when being worn and used, which greatly reduces user experience on using the smart glasses.

SUMMARY OF THE INVENTION

According to a first aspect, an embodiment of the present application provides a smart head-mounted device, including a first sub-eyepiece, a second sub-eyepiece, and a nose bridge, where
the first sub-eyepiece includes:
a first eyepiece frame, where the first eyepiece frame has a first connecting portion; and
a first temple, where the first temple has a first end and a second end that are disposed opposite each other, and the first end of the first temple is connected to the first eyepiece frame;
the second sub-eyepiece includes:
a second eyepiece frame, where the second eyepiece frame has a second connecting portion; and
a second temple, where the second temple has a first end and a second end that are disposed opposite each other, and the first end of the second temple is connected to the second eyepiece frame;
the nose bridge has a third connecting portion and a fourth connecting portion; and
the first eyepiece frame is detachably connected to the nose bridge via the first connecting portion and the third connecting portion, and the second eyepiece frame is detachably connected to the nose bridge via the second connecting portion and the fourth connecting portion.

According to a second aspect, an embodiment of the present application provides an accommodating box of a smart head-mounted device, including a shell body and a cover body movably connected to the shell body, where in a case that the cover body covers the shell body, the cover body and the shell body are enclosed to form an accommodating space, the accommodating space is used to accommodate the smart head-mounted device according to the first aspect, the accommodating space includes a first accommodating space, a second accommodating space, and a third accommodating space, the first accommodating space is used to accommodate the first sub-eyepiece, the second accommodating space is used to accommodate the second sub-eyepiece, and the third accommodating space is used to accommodate the nose bridge.

According to a third aspect, an embodiment of the present application provides a smart head-mounted device assembly, including the smart head-mounted device according to the first aspect and the accommodating box according to the second aspect.

The technical solutions used in the present application can achieve the following beneficial effects.

BRIEF DESCRIPTION OF DRAWINGS

The accompanying drawings described herein are used to disclose further understanding of the present application and constitute a part of the present application. The exemplary embodiments of the present application and descriptions thereof are used to explain the present application, and do not constitute an improper limitation on the present application. In the accompanying drawings.

DESCRIPTION OF THE INVENTION

To make the objectives, technical solutions, and advantages of the present application clearer, the following clearly describes the technical solutions in the embodiments of the present application with reference to the accompanying drawings in the embodiments of the present application. Apparently, the embodiments described are some rather than all of the embodiments of the present application. Based on the embodiments of the present application, all other embodiments obtained by a person of ordinary skill in the art fall within the protection scope of the present application.

Figure 1:
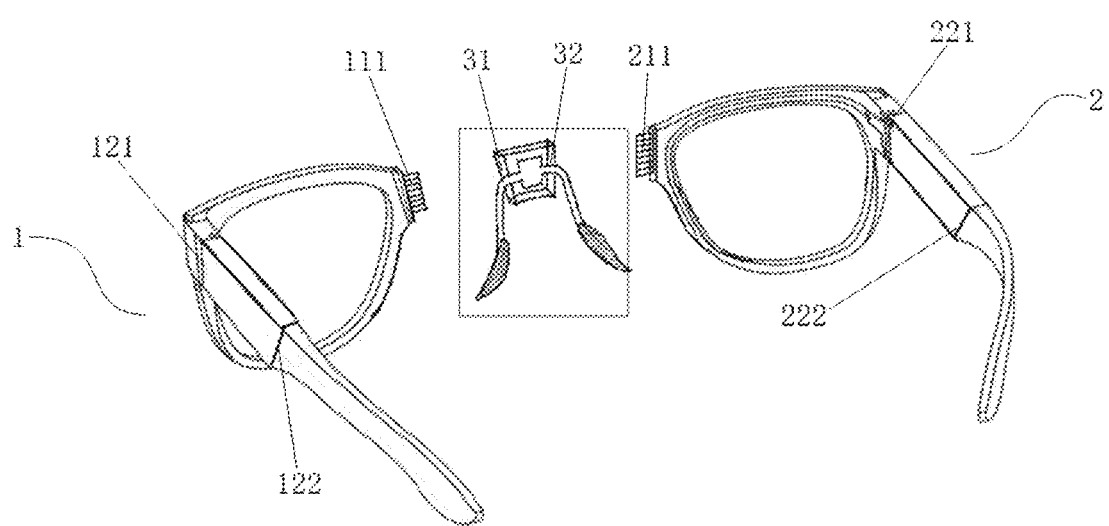
FIG. 1 is a schematic diagram of an exploded structure of a smart head-mounted device according to an embodiment of the present application.

As shown in FIG. 1, an embodiment of the present application provides a smart head-mounted device. The smart head-mounted device includes a first sub-eyepiece 1, a second sub-eyepiece 2, and a nose bridge 3. The first sub-eyepiece 1 includes a first eyepiece frame 11 and a first temple 12, and the first eyepiece frame 11 is provided with a first connecting portion 111. The first temple 12 is provided with a first end and a second end that are disposed opposite each other, and the first end of the first temple 12 is connected to the first eyepiece frame 11. The second sub-eyepiece 2 includes a second eyepiece frame 21 and a second temple 22, and the second eyepiece frame 21 has a second connecting portion 211. The second temple 22 is provided with a first end and a second end that are disposed opposite each other, and the first end of the second temple 22 is connected to the second eyepiece frame 21. The nose bridge 3 has a third connecting portion 31 and a fourth connecting portion 32. The first eyepiece frame 11 is detachably connected to the nose bridge 3 via the first connecting portion 111 and the third connecting portion 31, and the second eyepiece frame 21 is detachably connected to the nose bridge 3 via the second connecting portion 211 and the fourth connecting portion 32.

Figure 2:
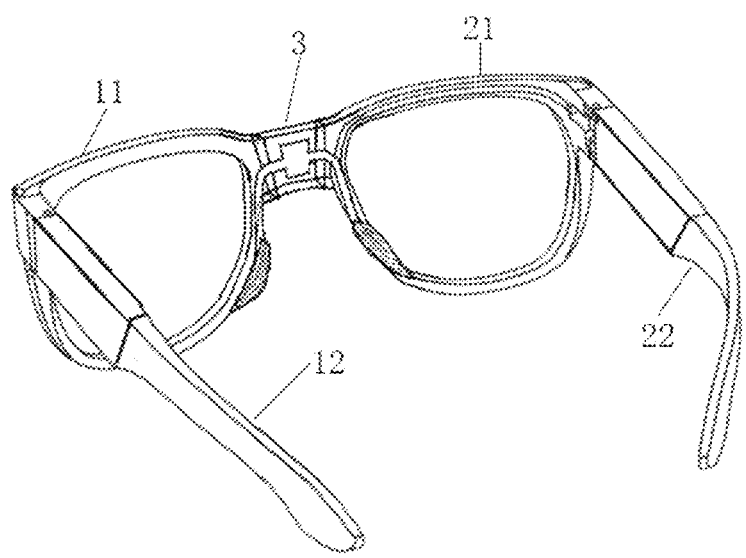
FIG. 2 is a schematic diagram of an integral structure of a smart head-mounted device according to an embodiment of the present application.
Figure 3:
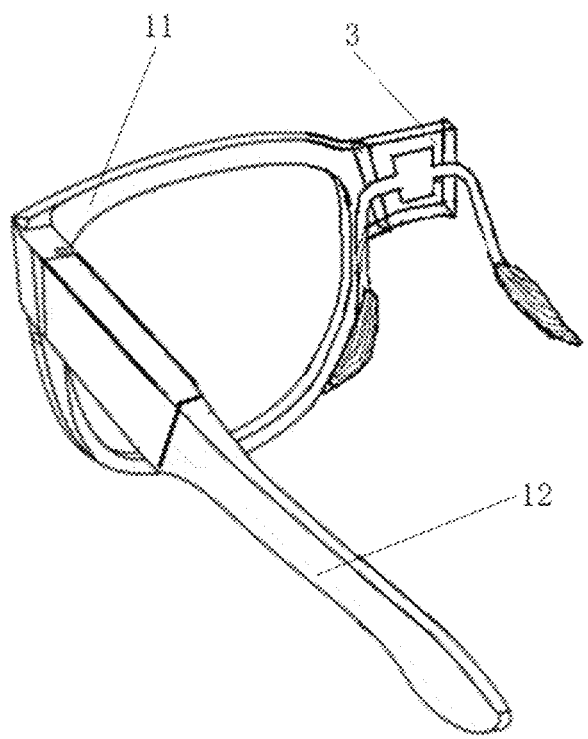
FIG. 3 is a schematic diagram of part of a structure of a smart head-mounted device according to an embodiment of the present application.
Figure 4:
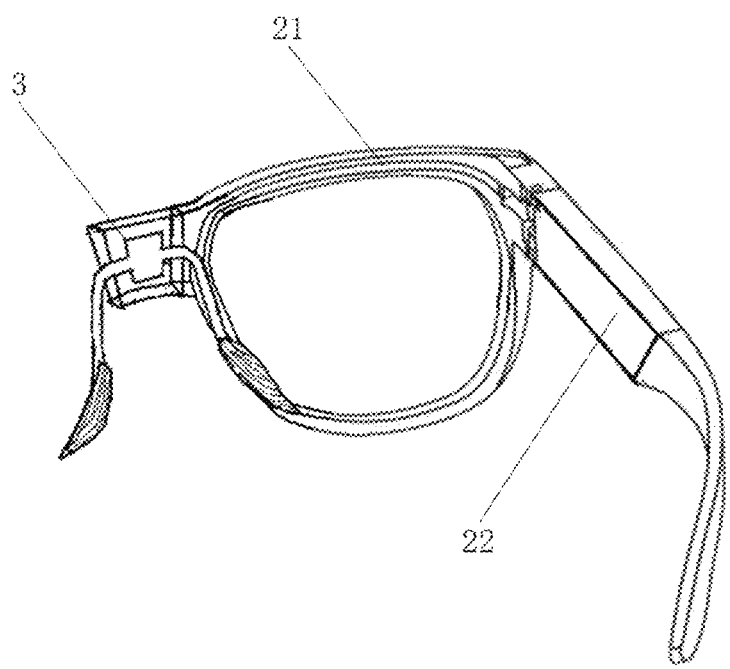
FIG. 4 is another schematic diagram of part of a structure of a smart head-mounted device according to an embodiment of the present application.

As shown in FIG. 2, when the first eyepiece frame 11 is connected to the second eyepiece frame 21 via the nose bridge 3, the first temple 12 and the second temple 22 are symmetrically distributed on side edges that are of the first eyepiece frame 11 and the second eyepiece frame 21 and that are far away from each other, and side edges that are of the first eyepiece frame 11 and the second eyepiece frame 21 and that are close to each other are spliced via the nose bridge 3, where both joints between the nose bridge 3, and the first eyepiece frame 11 and the second eyepiece frame 21 are foldable. It may be understood that, the first eyepiece frame 11 and the second eyepiece frame 21 are each provided with an embedded lens, and can be separated to obtain two independent single eyepieces, respectively. As shown in FIG. 3, the first sub-eyepiece 1 and the nose bridge 3 may constitute a first single eyepiece. As shown in FIG. 4, the second sub-eyepiece 2 and the nose bridge 3 may constitute a second single eyepiece. In this way, the first single eyepiece can be used independently when the second sub-eyepiece 2 is being charged; and similarly, the second single eyepiece can be used independently when the first sub-eyepiece 1 is being charged. Therefore, the smart head-mounted device can resolve the following problems: An existing smart head-mounted device cannot be used when being charged, and cannot be charged when being used. In some emergency or special occasions, a user can just use any one of the first single eyepiece or the second single eyepiece. In this way, normal vision and emergency data communication interaction, such as recording sports data or providing Bluetooth calls, can be provided to at least one eye. It should be understood that each of the first sub-eyepiece 1 and the second sub-eyepiece 2 is provided with an independent battery for supplying power. In addition, because both the first eyepiece frame 11 and the second eyepiece frame 21 are detachably connected to the nose bridge 3, the smart head-mounted device can be detached into three parts for accommodation, which may be as follows: First, the first eyepiece frame 11, the second eyepiece frame 21, and the nose bridge 3 are all detached; then, the first sub-eyepiece 1 and the second sub-eyepiece 2 are overlapped and accommodated in an accommodating box; and the nose bridge 3 is independently put into the accommodating box. Therefore, compared with un-detachable smart glasses in the prior art, a size of the accommodating box in a length direction can be reduced by half approximately, which effectively improves portability of the smart head-mounted device.

In an embodiment, in a case that the first eyepiece frame 11 is connected to the nose bridge 3, the first connecting portion 111 is in plug-in connection with the third connecting portion 31; or one of the first connecting portion 111 and the third connecting portion 31 is a magnetic member, and the other one is a magnetic attraction member, or both the first connecting portion 111 and the third connecting portion 31 are magnetic attraction members, and in a case that the first eyepiece frame 11 is connected to the nose bridge 3, the first connecting portion 111 is connected to the third connecting portion 31 via magnetic force.

As shown in FIG. 1, the first connecting portion 111 of the first eyepiece frame 11 may be in plug-in connection with the third connecting portion 31 of the nose bridge 3. The plug-in connection may be unidirectional plug-in connection. For example, the first connecting portion 111 of the first eyepiece frame 11 is an insertion piece; and correspondingly, the third connecting portion 31 of the nose bridge 3 is a matched slot through which the first connecting portion 111 is inserted in and connected to the third connecting portion 31. Certainly, the first connecting portion 111 of the first eyepiece frame 11 may alternatively be a slot; and correspondingly, the third connecting portion 31 of the nose bridge 3 is a matched insertion piece through which the third connecting portion 31 is inserted in and connected to the first connecting portion 111. The plug-in connection may alternatively be bidirectional plug-in connection. For example, the first connecting portion 111 of the first eyepiece frame 11 is provided with a first insertion piece and a first slot, and correspondingly, the third connecting portion 31 of the nose bridge 3 is provided with a second slot and a second insertion piece, where the first insertion piece is in matched plug-in connection with the second slot, and the second insertion piece is in matched plug-in connection with the first slot. Further, optionally, the first connecting portion 111 of the first eyepiece frame 11 is a charging socket; and correspondingly, the accommodating box is provided with a matched charging interface inside. Therefore, when the first eyepiece frame 11 is detached from the nose bridge 3 and accommodated in the accommodating box, the first eyepiece frame 11 can perform plug-in charging with the accommodating box through the charging socket of the first connecting portion 111, thereby implementing wired charging of the first sub-eyepiece 1.

Alternatively, the first connecting portion 111 of the first eyepiece frame 11 may be connected to the third connecting portion 31 of the nose bridge 3 via magnetic force. Owing to magnetic force, both connection and detaching are very convenient. Further, optionally, the first connecting portion 111 of the first eyepiece frame 11 is a magnetic charging interface; and correspondingly, the accommodating box is provided with a matched magnetic charging contact inside. Therefore, when the first eyepiece frame 11 is detached from the nose bridge 3 and accommodated in the accommodating box, the first eyepiece frame 11 can perform magnetic charging with the accommodating box through the magnetic charging interface of the first connecting portion 111, thereby implementing wired charging of the first sub-eyepiece 1.

In an embodiment, in a case that the second eyepiece frame 21 is connected to the nose bridge 3, the second connecting portion 211 is in plug-in connection with the fourth connecting portion 32; or one of the second connecting portion 211 and the fourth connecting portion 32 is a magnetic member, and the other one is a magnetic attraction member, or both the second connecting portion 211 and the fourth connecting portion 32 are magnetic attraction members, and in a case that the second eyepiece frame 21 is connected to the nose bridge 3, the second connecting portion 211 is connected to the fourth connecting portion 32 via magnetic force.

As shown in FIG. 1, the second connecting portion 211 of the second eyepiece frame 21 may be in plug-in connection with the fourth connecting portion 32 of the nose bridge 3. The plug-in connection may be unidirectional plug-in connection. For example, the second connecting portion 211 of the second eyepiece frame 21 is an insertion piece; and correspondingly, the fourth connecting portion 32 of the nose bridge 3 is a matched slot through which the second connecting portion 211 is inserted in and connected to the fourth connecting portion 32. Certainly, the second connecting portion 211 of the second eyepiece frame 21 may alternatively be a slot; and correspondingly, the fourth connecting portion 32 of the nose bridge 3 is a matched insertion piece through which the fourth connecting portion 32 is inserted in and connected to the second connecting portion 211. The plug-in connection may alternatively be bidirectional plug-in connection. For example, the second connecting portion 211 of the second eyepiece frame 21 is provided with a first insertion piece and a first slot, and correspondingly, the fourth connecting portion 32 of the nose bridge 3 is provided with a second slot and a second insertion piece, where the first insertion piece is in matched plug-in connection with the second slot, and the second insertion piece is in matched plug-in connection with the first slot. Further, optionally, the second connecting portion 211 of the second eyepiece frame 21 is a charging socket; and correspondingly, the accommodating box is provided with a matched charging interface inside. Therefore, when the second eyepiece frame 21 is detached from the nose bridge 3 and accommodated in the accommodating box, the second eyepiece frame 21 can perform plug-in charging with the accommodating box through the charging socket of the second connecting portion 211, thereby implementing wired charging of the second sub-eyepiece 2.

Alternatively, the second connecting portion 211 of the second eyepiece frame 21 may be connected to the fourth connecting portion 32 of the nose bridge 3 via magnetic force. Owing to magnetic force, both connection and detaching are very convenient. Further, optionally, the second connecting portion 211 of the second eyepiece frame 21 is a magnetic charging interface; and correspondingly, the accommodating box is provided with a matched magnetic charging contact inside. Therefore, when the second eyepiece frame 21 is detached from the nose bridge 3 and accommodated in the accommodating box, the second eyepiece frame 21 can perform magnetic charging with the accommodating box through the magnetic charging interface of the second connecting portion 211, thereby implementing wired charging of the second sub-eyepiece 2.

As shown in FIG. 1, in an embodiment, the first temple 12 is provided with a first folding portion 121 and a second folding portion 122, the first folding portion 121 is disposed close to the first end of the first temple 12, and the second folding portion 122 is disposed between the first folding portion 121 and the second end of the first temple 12.

Owing to arrangement of the first folding portion 121 and the second folding portion 122, the first temple 12 can be folded twice. The first temple 12 is first folded along the second folding portion 122 and then folded along the first folding portion 121. Therefore, after twice folding, space occupied by the first eyepiece frame 11 and the first temple 12 during accommodation can be greatly reduced, thereby improving portability of the first sub-eyepiece 1.

In an embodiment, in a case that both the first folding portion 121 and the second folding portion 122 are in a folded state, a first plane on which the first temple 12 is disposed is parallel to a second plane on which the first eyepiece frame 11 is disposed.

After the first temple 12 is folded along the second folding portion 122 and the first folding portion 121, the first temple 12 and the first eyepiece frame 11 are parallel to each other. In this case, a thickness of the first sub-eyepiece 1 is relatively small, which facilitates carrying and accommodation.

Further, optionally, after the first temple 12 is folded along the first folding portion 121 and the second folding portion 122, the second end of the first temple 12 does not exceed the first eyepiece frame 11. Therefore, after the first temple 12 is folded twice, a size of the entire first sub-eyepiece 1 is approximately as small as a size of the first eyepiece frame 11, so that the first sub-eyepiece 1 is smaller and more convenient to carry.

Figure 5:
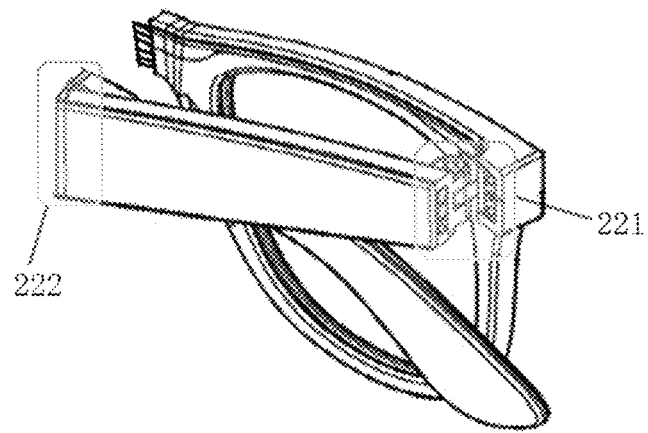
FIG. 5 is still another schematic diagram of part of a structure of a smart head-mounted device according to an embodiment of the present application.

As shown in FIG. 1 and FIG. 5, in an embodiment, the second temple 22 is provided with a third folding portion 221 and a fourth folding portion 222, the third folding portion 221 is disposed close to the first end of the second temple 22, and the fourth folding portion 222 is disposed between the third folding portion 221 and the second end of the second temple 22.

Owing to arrangement of the third folding portion 221 and the fourth folding portion 222, the second temple 22 can be folded twice. The second temple 22 is first folded along the fourth folding portion 222 and then folded along the third folding portion 221. Therefore, after twice folding, space occupied by the second eyepiece frame 21 and the second temple 22 during accommodation can be greatly reduced, thereby improving portability of the second sub-eyepiece 2.

In an embodiment, in a case that both the third folding portion 221 and the fourth folding portion 222 are in a folded state, a third plane on which the second temple 22 is disposed is parallel to a fourth plane on which the second eyepiece frame 21 is disposed.

After the second temple 22 is folded along the fourth folding portion 222 and the third folding portion 221, the second temple 22 and the second eyepiece frame 21 are parallel to each other. In this case, a thickness of the entire second sub-eyepiece 2 is relatively small, which facilitates carrying and accommodation.

Further, optionally, after the second temple 22 is folded along the third folding portion 221 and the fourth folding portion 222, the second end of the second temple 22 does not exceed the second eyepiece frame 21. Therefore, after the second temple 22 is folded twice, a size of the entire second sub-eyepiece 2 is approximately as small as a size of the second eyepiece frame 21, so that the second sub-eyepiece 2 is smaller and more convenient to carry.

In one embodiment, the first sub-eyepiece 1 and/or the second sub-eyepiece 2 are/is provided with a wireless charging component. Further, optionally, in a case that the first sub-eyepiece 1 is provided with the wireless charging component, the wireless charging component is disposed on the first eyepiece frame 11 and/or the first temple 12; and in a case that the second sub-eyepiece 2 is provided with the wireless charging component, the wireless charging component is disposed on the second eyepiece frame 21 and/or the second temple 22.

The wireless charging component may be, for example, a wireless charging coil; and correspondingly, the accommodating box is also provided with a wireless charging coil inside. Therefore, wireless charging can be realized after the smart head-mounted device is put into the accommodating box.

Figure 7:
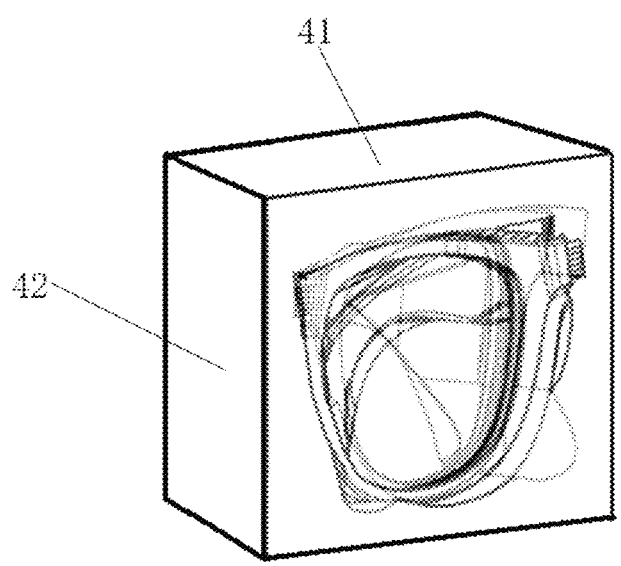
FIG. 7 is a schematic diagram of taking off a smart head-mounted device and putting the smart head-mounted device into an accommodating box according to an embodiment of the present application.

As shown in FIG. 7, an embodiment of the present application further provides an accommodating box of a smart head-mounted device. The accommodating box includes a shell body 41 and a cover body 42 movably connected to the shell body 41, where in a case that the cover body 42 covers the shell body 41, the cover body 42 and the shell body 41 are enclosed to form an accommodating space, the accommodating space is used to accommodate the smart head-mounted device described above, the accommodating space includes a first accommodating space, a second accommodating space, and a third accommodating space, the first accommodating space is used to accommodate the first sub-eyepiece 1 described above, the second accommodating space is used to accommodate the second sub-eyepiece 2 described above, and the third accommodating space is used to accommodate the nose bridge 3 described above.

Optionally, the first eyepiece frame 11, the second eyepiece frame 21, and the nose bridge 3 are detached and separated; both the first temple 12 and the second temple 22 are folded twice; and then, the first sub-eyepiece 1, the second sub-eyepiece 2, and the nose bridge 3 that are separated and folded are put into the accommodating box. The two sub-eyepieces are overlapped front and back in a thickness direction of the accommodating box and disposed in the accommodating box, so that a size of the entire accommodating box is very small and exquisite, and the accommodating box is more convenient to carry. The accommodating box is provided with a first accommodating space, a second accommodating space, and a third accommodating space inside. The three accommodating cavities are independent of each other. The first accommodating space is used to accommodate the first sub-eyepiece 1, the second accommodating space is used to accommodate the second sub-eyepiece 2, and the third accommodating space is used to accommodate the nose bridge 3. In this way, all of the first sub-eyepiece 1, the second sub-eyepiece 2, and the nose bridge 3 can be accommodated in a relatively independent manner, which avoids squeezing contact during accommodation of the first sub-eyepiece 1, the second sub-eyepiece 2, and the nose bridge 3.

In an embodiment, the first sub-eyepiece 1 is provided with a first magnet, the second sub-eyepiece 2 is provided with a second magnet, the nose bridge 3 is provided with a third magnet, the first accommodating space is provided with a first Hall sensor, the second accommodating space is provided with a second Hall sensor, and the third accommodating space is provided with a third Hall sensor. In a case that the first sub-eyepiece 1 is accommodated in the first accommodating space, the first magnet and the first Hall sensor are distributed opposite each other; in a case that the second sub-eyepiece 2 is accommodated in the second accommodating space, the second magnet and the second Hall sensor are distributed opposite each other; and in a case that the nose bridge 3 is accommodated in the third accommodating space, the third magnet and the third Hall sensor are distributed opposite each other.

In one embodiment, at least one of the shell body 41 or the cover body 42 is provided with a controller and an alarm, the controller is electrically connected to the first Hall sensor, the second Hall sensor, and the third Hall sensor, and the controller is further electrically connected to the alarm.

Loss may occur if the smart head-mounted device is not accommodated in time after being detached. Therefore, in this embodiment, the accommodating box is provided with an anti-loss function. For example, when both the first sub-eyepiece 1 and the second sub-eyepiece 2 are put into the accommodating box, but the nose bridge 3 is not put into the accommodating box, the first Hall sensor can detect the first magnet and sends a detection signal to a controller after the first sub-eyepiece 1 is put into the first accommodating space; the second Hall sensor can detect the second magnet and sends a detection signal to the controller after the second sub-eyepiece 2 is put into the second accommodating space; and because the nose bridge 3 is not put into the third accommodating space, the third Hall sensor fails to detect the third magnet and does not send a detection signal to the controller. In this case, the controller triggers an alarm. Optionally, the alarm is an acousto-optic alarm. For another example, when both the first sub-eyepiece 1 and the nose bridge 3 are put into the accommodating box, but the second sub-eyepiece 2 is not put into the accommodating box, the first Hall sensor can detect the first magnet and sends a detection signal to a controller after the first sub-eyepiece 1 is put into the first accommodating space; the third Hall sensor can detect the third magnet and sends a detection signal to the controller after the nose bridge 3 is put into the third accommodating space; and because the second sub-eyepiece 2 is not put into the second accommodating space, the second Hall sensor fails to detect the second magnet and does not send a detection signal to the controller. In this case, the controller triggers the alarm. Other cases have a same principle. Details are not described herein again. In other words, the controller triggers the alarm, provided that any one or two of the first Hall sensor, the second Hall sensor, and the third Hall sensor send detection signals to the controller and the other two or one does not send a detection signal to the controller. Certainly, there may be no controller, and the first Hall sensor, the second Hall sensor, and the third Hall sensor are connected to a trigger switch of the alarm. Therefore, a same effect can be achieved.

In an embodiment, the first accommodating space is provided with a fifth connecting portion, and in a case that the first sub-eyepiece 1 is accommodated in the first accommodating space, the first connecting portion 111 is connected to the fifth connecting portion; the second accommodating space is provided with a sixth connecting portion, and in a case that the second sub-eyepiece 2 is accommodated in the second accommodating space, the second connecting portion 211 is connected to the sixth connecting portion; and the third accommodating space is provided with a seventh connecting portion, and in a case that the nose bridge 3 is accommodated in the third accommodating space, at least one of the third connecting portion 31 or the fourth connecting portion 32 is connected to the seventh connecting portion.

Optionally, the first connecting portion 111 and the fifth connecting portion are electric connecting portions matched with each other, so that in a case that the first sub-eyepiece 1 is accommodated in the first accommodating space, the first connecting portion 111 and the fifth connecting portion are electrically connected to each other, thereby implementing charging the first sub-eyepiece 1 by the accommodating box. Similarly, the second connecting portion 211 and the sixth connecting portion are electric connecting portions matched with each other, so that in a case that the second sub-eyepiece 2 is accommodated in the second accommodating space, the second connecting portion 211 and the sixth connecting portion are electrically connected to each other, thereby implementing charging the second sub-eyepiece 2 by the accommodating box. In addition, the seventh connecting portion and at least one of the third connecting portion 31 or the fourth connecting portion 32 are electric connecting portions matched with each other, so that in a case that the nose bridge 3 is accommodated in the third accommodating space, at least one of the third connecting portion 31 or the fourth connecting portion 32 is electrically connected to the seventh connecting portion. Therefore, fixing the nose bridge 3 can be implemented; and some expanding functions of the nose bridge 3 can also be implemented, for example, the nose bridge 3 is provided with a chip, thereby performing interacting with the accommodating box.

Figure 6:
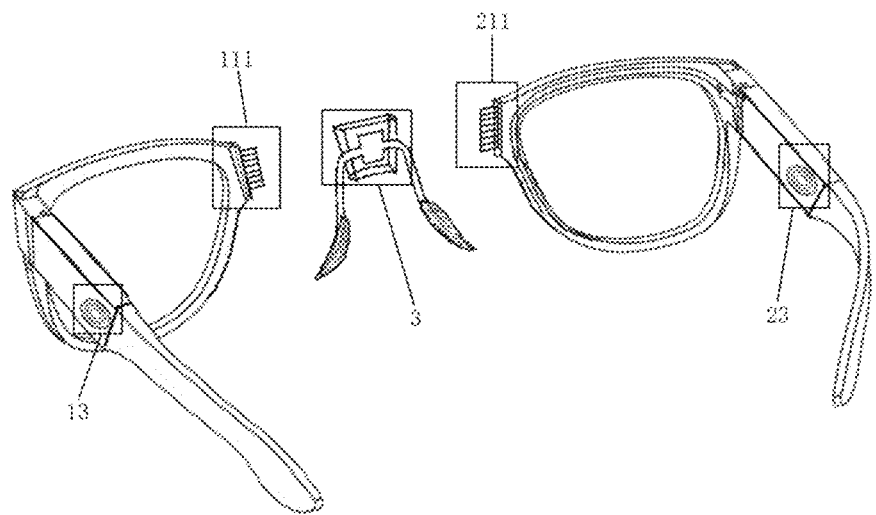
FIG. 6 is a schematic diagram of disposing a wireless charging component in a smart head-mounted device according to an embodiment of the present application.

As shown in FIG. 6, in one embodiment, the first sub-eyepiece 1 is provided with a first wireless charging component 13; and the second sub-eyepiece 2 is provided with a second wireless charging component 23. The first accommodating space is provided with a third wireless charging component, and the second accommodating space is provided with a fourth wireless charging component. In a case that the first sub-eyepiece 1 is accommodated in the first accommodating space, the first wireless charging component 13 and the third wireless charging component are distributed opposite each other. In a case that the second sub-eyepiece 2 is accommodated in the second accommodating space, the second wireless charging component 23 and the fourth wireless charging component are distributed opposite each other.

As the third wireless charging component distributed opposite the first wireless charging component 13 is disposed in the first accommodating space, in a case that the first sub-eyepiece 1 is accommodated in the first accommodating space, wireless charging of the first sub-eyepiece 1 by the accommodating box is implemented. Similarly, as the fourth wireless charging component distributed opposite the second wireless charging component 23 is disposed in the second accommodating space, in a case that the second sub-eyepiece 2 is accommodated in the second accommodating space, wireless charging of the second sub-eyepiece 2 by the accommodating box is implemented.

An embodiment of the present application further provides a smart head-mounted device assembly, including the smart head-mounted device described above and the accommodating box described above.

In the accompanying drawings of the embodiments, the same or similar reference numerals denote the same or similar components. In the description of the present application, it should be understood that orientations or position relationships indicated by terms such as "upper", "lower", "left", "right", "inside", or "outside" are orientations or position relationships shown in the accompanying drawings, and these terms are just used to facilitate description of the present application and simplify the description, but not to indicate or imply that the mentioned apparatuses or elements must have a specific orientation or must be constructed and operated in a specific orientation. Therefore, the terms for describing position relationships in the accompanying drawings are only for illustrative description but should not be construed as a limitation to the present application. A person of ordinary skill in the art may interpret the specific meaning of the above terms according to specific conditions.

It should be noted that, in this specification, the terms "include", "comprise", or any of their variants are intended to cover a non-exclusive inclusion, so that a process, a method, an article, or an apparatus that includes a series of elements includes not only those elements but also other elements that are not expressly listed, or further includes elements inherent to such a process, method, article, or apparatus. In the absence of more restrictions, an element defined by "including a . . . " does not exclude another same element in a process, method, article, or apparatus that includes the element.

The embodiments of the present application are described above with reference to the accompanying drawings, but the present application is not limited to the above specific implementations, and the above specific implementations are only illustrative and not restrictive. Under the enlightenment of the present application, a person of ordinary skill in the art can make many forms without departing from the objective of the present application and the protection scope of the claims, all of which fall within the protection of the present application.

What is claimed is:

1. A smart head-mounted device, comprising a first sub-eyepiece, a second sub-eyepiece, and a nose bridge, wherein the first sub-eyepiece comprises:
    a first eyepiece frame, wherein the first eyepiece frame has a first connecting portion; and
    a first temple, wherein the first temple has a first end and a second end that are disposed opposite each other, and the first end of the first temple is connected to the first eyepiece frame;
   the second sub-eyepiece comprises:
    a second eyepiece frame, wherein the second eyepiece frame has a second connecting portion; and
    a second temple, wherein the second temple has a first end and a second end that are disposed opposite each other, and the first end of the second temple is connected to the second eyepiece frame;
   the nose bridge has a third connecting portion and a fourth connecting portion; and
   the first eyepiece frame is detachably connected to the nose bridge via the first connecting portion and the third connecting portion, and the second eyepiece frame is detachably connected to the nose bridge via the second connecting portion and the fourth connecting portion;
   the first sub-eyepiece is charged through the first connecting portion, and the second sub-eyepiece is charged through the second connecting portion.

2. The smart head-mounted device according to claim 1, wherein in response to the first eyepiece frame being connected to the nose bridge, the first connecting portion is in plug-in connection with the third connecting portion.

3. The smart head-mounted device according to claim 1, wherein in response to the second eyepiece frame being connected to the nose bridge, the second connecting portion is in plug-in connection with the fourth connecting portion.

4. The smart head-mounted device according to claim 1, wherein the first temple comprises a first folding portion and a second folding portion, the first folding portion is disposed close to the first end of the first temple, and the second folding portion is disposed between the first folding portion and the second end of the first temple.

5. The smart head-mounted device according to claim 4, wherein both the first folding portion and the second folding portion are in a folded state, a first plane on which the first temple is disposed is parallel to a second plane on which the first eyepiece frame is disposed.

6. The smart head-mounted device according to claim 1, wherein the second temple comprises a third folding portion and a fourth folding portion, the third folding portion is disposed close to the first end of the second temple, and the fourth folding portion is disposed between the third folding portion and the second end of the second temple.

7. The smart head-mounted device according to claim 6, wherein both the third folding portion and the fourth folding portion are in a folded state, a third plane on which the second temple is disposed is parallel to a fourth plane on which the second eyepiece frame is disposed.

8. The smart head-mounted device according to claim 1, wherein the first sub-eyepiece and/or the second sub-eyepiece is provided with a wireless charging component.

9. A smart head-mounted device assembly, comprising the smart head-mounted device according to claim 1.

10. The smart head-mounted device according to claim 1, wherein one of the first connecting portion and the third connecting portion is a magnetic member, and another of the first connecting portion and the third connecting portion is a magnetic attraction member, and in response to the first eyepiece frame being connected to the nose bridge, the first connecting portion is connected to the third connecting portion via magnetic force.

11. The smart head-mounted device according to claim 1, wherein both the first connecting portion and the third connecting portion are magnetic attraction members, and in response to the first eyepiece frame being connected to the nose bridge, the first connecting portion is connected to the third connecting portion via magnetic force.

12. The smart head-mounted device according to claim 1, wherein one of the second connecting portion and the fourth connecting portion is a magnetic member, and the other one is a magnetic attraction member, and in response to the second eyepiece frame being connected to the nose bridge, the second connecting portion is connected to the fourth connecting portion via magnetic force.

13. The smart head-mounted device according to claim 1, wherein both the second connecting portion and the fourth connecting portion are magnetic attraction members, and in response to the second eyepiece frame being connected to the nose bridge, the second connecting portion is connected to the fourth connecting portion via magnetic force.

\* \* \* \* \*